United States Patent
LeMer et al.

(10) Patent No.: US 7,302,916 B2
(45) Date of Patent: Dec. 4, 2007

(54) CONDENSATION HEAT EXCHANGER WITH A GAS/AIR HEAT COLLECTOR

(75) Inventors: Joseph LeMer, Ty Nod-29600, Morlaix (FR); Rocco Giannoni, Via Fiori Oscuri, 3-20121 Milan (IT)

(73) Assignees: Rocco Giannoni, Milan (IT); Joseph LeMer, Morlaix (FR); Giannoni France, Morlaix (FR)

( * ) Notice: Subject to any disclaimer, the term of this patent is extended or adjusted under 35 U.S.C. 154(b) by 0 days.

(21) Appl. No.: 10/554,273

(22) PCT Filed: Apr. 23, 2004

(86) PCT No.: PCT/FR2004/000992

§ 371 (c)(1),
(2), (4) Date: Apr. 6, 2006

(87) PCT Pub. No.: WO2004/097311

PCT Pub. Date: Nov. 11, 2004

(65) Prior Publication Data
US 2006/0266306 A1    Nov. 30, 2006

(30) Foreign Application Priority Data
Apr. 25, 2003    (FR) .................................. 03 05105

(51) Int. Cl.
*F24D 19/00* (2006.01)

(52) U.S. Cl. .................... 122/18.1; 122/15.1; 122/33

(58) Field of Classification Search ............... 122/15.1, 122/18.1, 32, 31.1, 33, 248, 266, 267; 165/163
See application file for complete search history.

(56) References Cited

U.S. PATENT DOCUMENTS

| 2,064,928 A | 12/1936 | Lewis |
| 4,852,640 A | 8/1989 | McKenna |
| 5,687,678 A * | 11/1997 | Suchomel et al. ...... 122/250 R |
| 6,305,331 B1 * | 10/2001 | Fullemann et al. ........ 122/18.3 |

(Continued)

FOREIGN PATENT DOCUMENTS

DE    35 02 972 A1    7/1986

(Continued)

OTHER PUBLICATIONS

WO 02/33316 A1.*

*Primary Examiner*—Gregory Wilson
(74) *Attorney, Agent, or Firm*—Foley & Lardner LLP

(57) ABSTRACT

A condensation heat exchanger adapted to interface with a gas or fuel-oil burner, the condensation heat exchanger including two coaxial tube bundles placed end-to-end, one of which acts as primary exchanger and the other of which acts as secondary exchanger. Each of these bundles include at least one of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix. The width of the gap separating two adjacent turns is constant and smaller than the thickness of the cross section, the bundles being mounted securely inside a gas-impermeable jacket.

16 Claims, 12 Drawing Sheets

U.S. PATENT DOCUMENTS

2003/0079869 A1    5/2003   Brunner et al.
2006/0102106 A1*   5/2006   Le Mer et al. ................ 122/32

FOREIGN PATENT DOCUMENTS

| | | |
|---|---|---|
| DE | 203 04 946 | 7/2003 |
| DE | 203 04 946 U1 | 8/2003 |
| DE | 103 02 708 | 7/2004 |
| DE | 103 02 708 A1 | 7/2004 |
| EP | 0 029 573 A2 | 6/1981 |
| EP | 0 806 616 A2 | 11/1997 |
| EP | 1 160 520 A2 | 12/2001 |
| EP | 1 251 319 | 10/2002 |
| EP | 1 251 319 A2 | 10/2002 |
| FR | 0 503 845 | 10/1982 |
| FR | 2 503 845 | 10/1982 |
| FR | 2 846 075 | 4/2004 |
| FR | 2 846 075 A1 | 4/2004 |
| FR | 2 850 451 A1 | 7/2004 |
| GB | 2 033 570 | 5/1980 |
| GB | 2 033 570 A | 5/1980 |
| GB | 2 122 928 A | 1/1984 |
| GB | 2 149 484 A | 1/1985 |
| GB | 2 149 484 | 6/1985 |
| WO | WO 94/16272 | 7/1994 |
| WO | WO 94/16272 A1 | 7/1994 |
| WO | WO 01/90656 A1 | 11/2001 |
| WO | WO 02/33316 | 4/2002 |
| WO | WO 02/33316 A1 | 4/2002 |
| WO | WO 03/052327 A1 | 6/2003 |

* cited by examiner

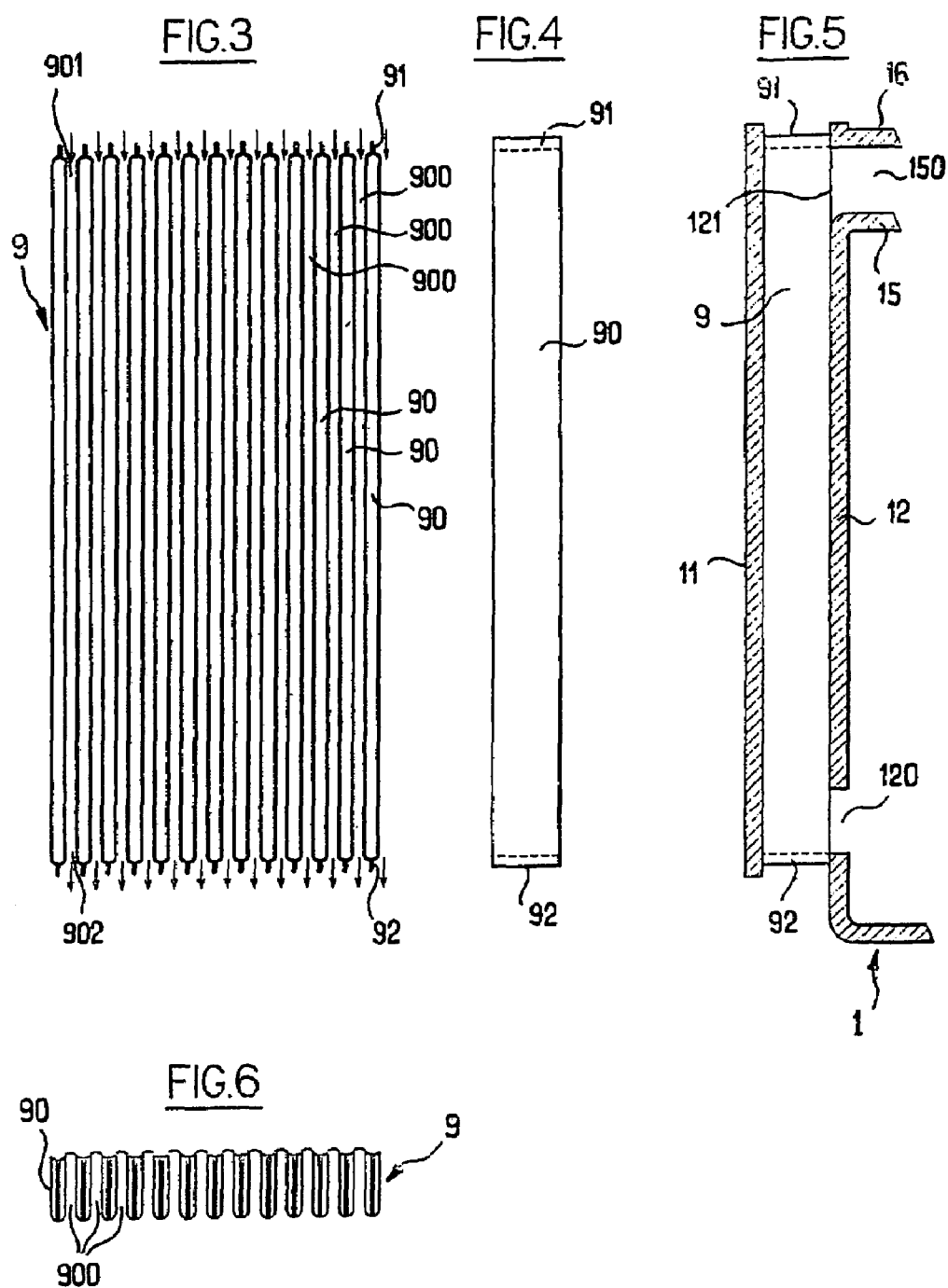

FIG_8

FIG_11
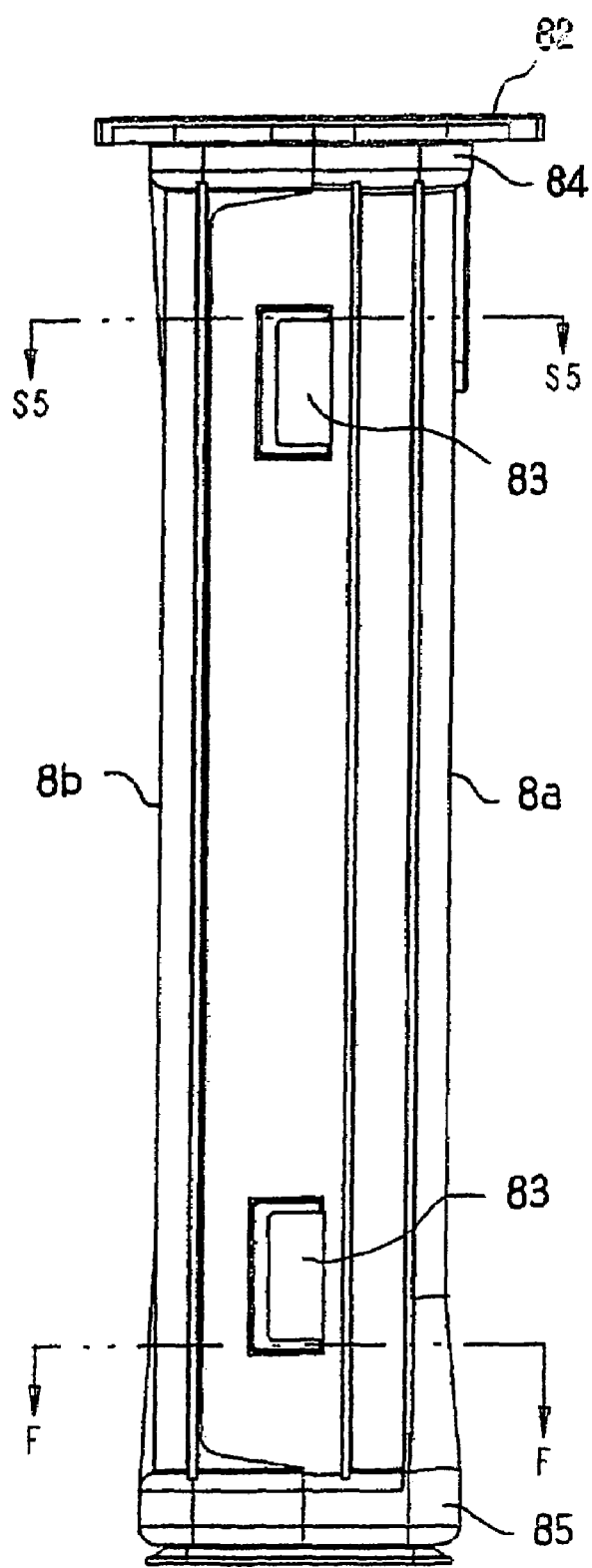

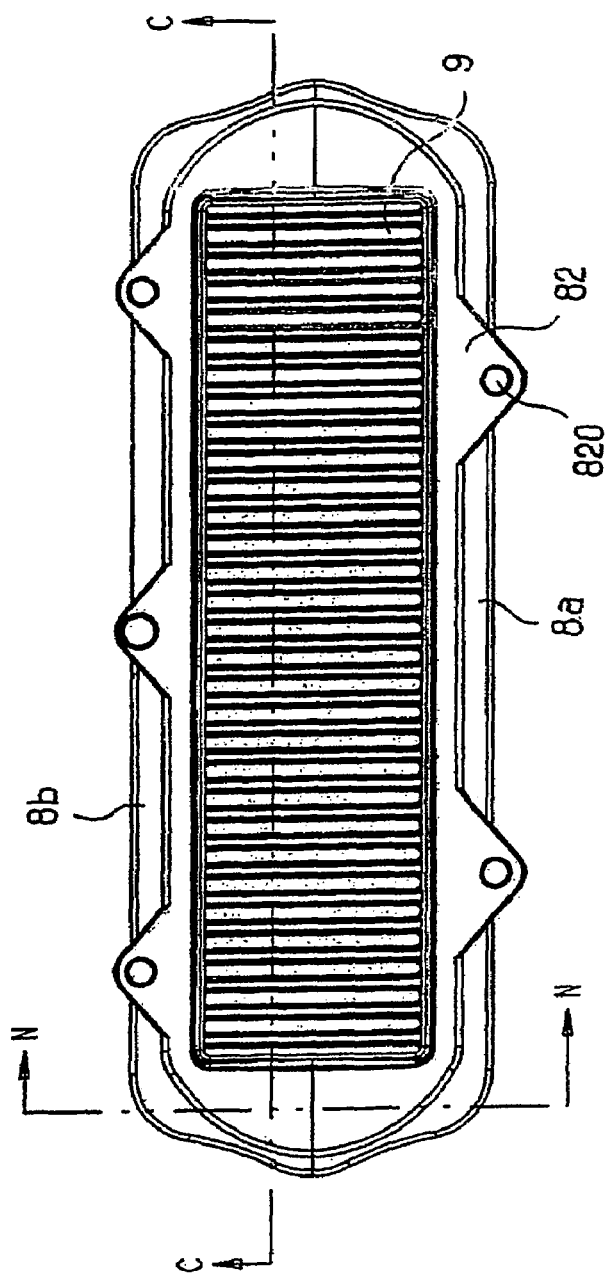
FIG_12
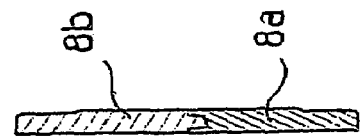
FIG_13
SECTION N-N

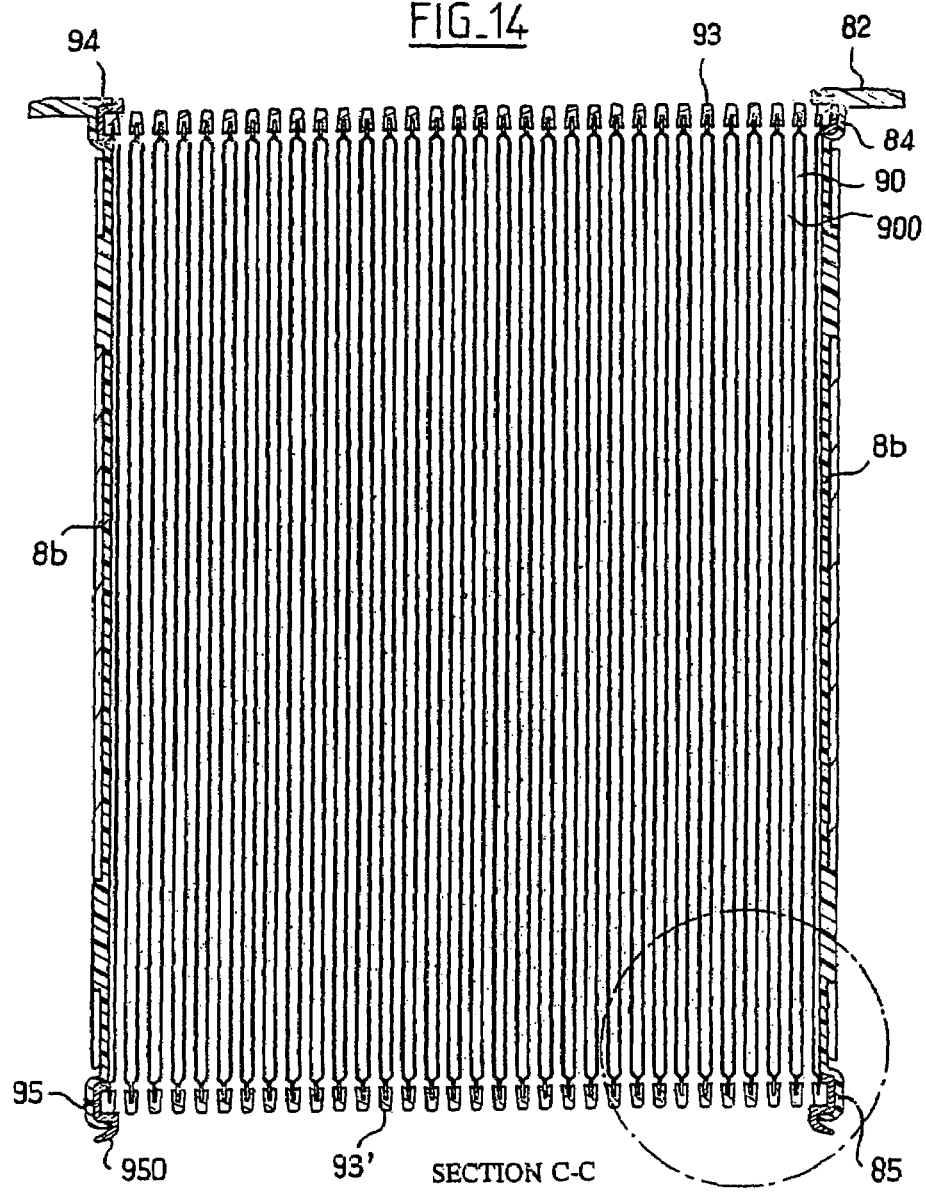

SECTION S4-S4

SECTION S5-S5

SECTION F-F

FIG_18
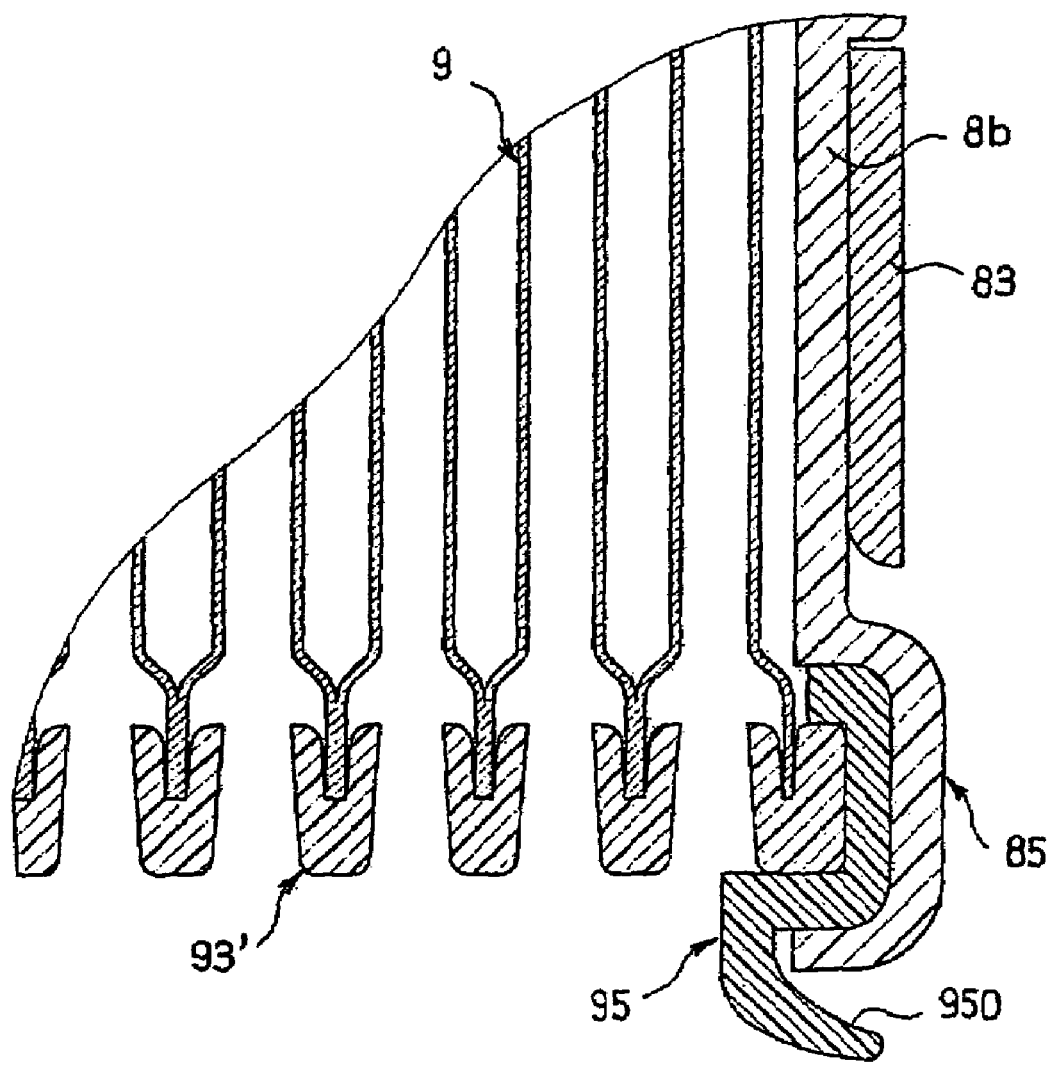

US 7,302,916 B2

CONDENSATION HEAT EXCHANGER WITH A GAS/AIR HEAT COLLECTOR

BACKGROUND OF THE INVENTION

The present invention relates to a condensation heat exchanger associated—directly or indirectly—with a burner, in particular a gas or fuel-oil burner, and equipped with a gas/air heat recuperator.

An exchanger of this type is designed particularly to be fitted to a domestic gas boiler for supplying a central-heating system and/or for providing water for household use.

Advantageously, but not necessarily, the heat exchanger that is the subject of the invention is of the type that comprises a jacket delimiting an enclosure accommodating at least one bundle made up of a tube or tubes of flattened cross section, of the type described in document EP-B-0 678 186, to which reference may be made if required.

Said document describes a heat exchanger element that consists of a tube made from a material that is a good conductor of heat and in which a heat-transfer fluid, for example water to be heated, is intended to circulate.

The tube is wound as a helix and has an oval, flattened cross section, the major axis of which is substantially perpendicular to the axis of the helix, and each turn of the tube has planar faces that are separated from the faces of the adjacent turn by a gap of constant width, this width being substantially smaller than the thickness of said cross section, the space between two adjacent turns also being fixed by means of spacers consisting, for example, of bosses formed in the tube wall.

Said document also describes heat exchangers that include several elements such as those described above, arranged in different ways in the various embodiments disclosed.

An exchanger element designed in this way is capable of ensuring a very efficient heat exchange between very hot gases on the one hand, which may be generated directly by a burner mounted in the enclosure or originate from an external source, which sweep over the tubular element, and, on the other hand, the fluid, such as water, to be heated, which circulates inside the tubular element.

In fact, as it passes across the gap between the turns, in an approximately radial direction, the flow of hot gases comes into contact with a relatively large surface area of the wall of the exchanger element.

The jacket forming the condensation units of the type described above, just like the tube or tubes, may be made from metal, particularly stainless steel.

It is, however, advantageously produced from plastic, as mentioned in French patent applications No 02/12848 (Oct. 16, 2002) and No 03/00775 (Jan. 24, 2003).

In this case, the exchanger includes means for mechanical containment of the bundle, in the axial direction of the latter, capable of absorbing the thrust forces that result from the internal pressure of the fluid circulating therein and which tends to deform the walls thereof, preventing these forces being transferred to the jacket.

The two roles hitherto fulfilled by the jacket, namely serving as the enclosure for circulation and evacuation of the hot gases and for the collection and evacuation of the condensates and, in addition, guaranteeing the mechanical robustness of the tube bundle, are thus separated.

The condensation heat exchanger according to the invention is associated with a gas or fuel-oil burner, and comprises at least one tube bundle through which a fluid to be heated, in particular cold water, circulates and which is mounted inside a gas-impermeable jacket for example made from plastic, said tube bundle being exposed to hot gases generated by the burner, while the jacket has a flue-gas evacuation sleeve.

According to a preferred embodiment, the condensation heat exchanger according to the invention comprises two coaxial tube bundles placed end-to-end, one of which acts as primary exchanger and the other of which acts as secondary exchanger, each of these bundles consisting of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix, while the width of the gap separating two adjacent turns is constant and, particularly, smaller than the thickness of said cross section, said bundles being mounted inside a gas-impermeable jacket.

The burner is arranged inside the primary exchanger.

Means are provided in order to circulate at least one fluid to be heated, in particular cold water, inside the tube(s) forming said bundles, the above mentioned jacket said jacket having a burnt-gas evacuation sleeve, the exchanger being arranged such that the hot gases supplying the exchanger generated by the burner flow radially, or approximately radially, through said bundles, passing through the gaps separating its turns, a deflection plate also being interposed between these two bundles and arranged in such a manner that said hot gases first flow through the primary exchanger, flowing through the gaps separating its turns from the inside to the outside, then the secondary exchanger, flowing through the gaps separating its turns, this time from the outside to the inside, after which they are evacuated to the outside via the above-mentioned sleeve.

As in the device shown in FIG. 18 of document EP-B-0 678 186 cited above, the deflection plate advantageously consists of a disk made from refractory, thermally insulating material based, for example, on ceramics, mounted at the free end of the burner. This disk is provided at its periphery with a thermally insulating seal that is applied against the inside of the bundle.

Changes in regulations relating to the emission of polluting gases emanating from domestic heating units increasingly encourage boiler manufacturers to design units that minimize emissions that are likely to pollute the atmosphere.

Condensing boilers functioning with a blown-gas burner ensure good combustion and make it possible to recover the latent heat contained in the flue gases by virtue of the condensation phenomenon, which reduces the quantity of pollutant emissions as compared to conventional boilers.

Nevertheless, the exit temperature of the flue gases is limited by the temperature of the fluid, particularly the water, to be heated. Thus, if this water enters the exchanger at a temperature of 50° C. and exits therefrom at a temperature of 70° C. it is not possible to envisage lowering the temperature of the flue gases to a value below 50° C. In practice, this value will ultimately be close to 70° C.

It is indeed the temperature of the water entering the unit that limits the temperature of the flue gases escaping therefrom with their polluting particles. The condensation limit also depends on the temperature of the incoming water to the extent that if this temperature is equal to or higher than the dew point of the flue gases there is no condensation.

In point of fact, in the case of flue gases resulting from combustion of natural gas, this dew point is of the order of 55° C.

The flue gases generated by the exchanger are thus diffused into the atmosphere at a relatively high temperature, producing an unattractive white plume (on account of the water vapor conveyed by it), with polluting particles and with a heat loss that detracts from the unit's overall performance.

In order to palliate these drawbacks, it is known to add an additional gas/air exchanger onto the exchanger, the function of which is to preheat the (fresh) combustion air captured outside before conveying it to the burner, this being with the aid of the still-hot flue gases that are exiting the exchanger, i.e. the burnt gases.

A system of this type is described, for example, in U.S. Pat. No. 4,640,232.

By virtue of this arrangement, it is the temperature of the outside air and no longer the temperature of the water that determines whether the water vapor present in the flue gases will condense. As this temperature is below the dew point, almost total condensation is achieved such that the expelled flue gases are cold and practically free from polluting particles, the latter being present in the flue gas condensate.

Furthermore, as the air reaching the burner is warm, combustion is improved and the performance is better.

The air captured outside is generally moist and polluted, particularly in an urban atmosphere. As it passes into the additional gas/air exchanger, condensation of the water vapor it is conveying also occurs when it encounters the warm walls of the exchanger. The water droplets that form trap the polluting particles, which are therefore contained within the incoming-air condensate. The additional gas/air exchanger thus also fulfills the function of scrubbing the combustion air.

In this way, clean air that has been rid of its impurities is used as combustion air, which also improves the quality of combustion and significantly reduces fouling of the principal exchanger.

SUMMARY OF THE INVENTION

The drawback of known devices, which combine an additional gas/air exchanger of this type with a condensation exchanger of the type described above, is that they are relatively bulky and have a high cost price.

The aim of the present invention is to propose a condensation exchanger in which the additional gas/air exchanger is incorporated in as compact a manner as possible, the design of this additional exchanger being such that its presence only slightly increases the weight and cost price of the unit while significantly improving the latter's performance.

This aim is achieved, in accordance with the invention, by virtue of the fact that the jacket of the condensation exchanger has a wall portion having the configuration of a compartment accommodating a gas/air heat recuperator/exchanger capable of recovering some of the heat conveyed by the flue gases leaving the tube bundle and channeled toward the exit sleeve in order to transfer it to air captured outside the exchanger, means such as a fan also being provided in order to transfer the air heated by said gas/air heat recuperator to the entrance of said burner.

Furthermore, in accordance with a number of advantageous but non-limiting features of the invention:

said compartment consists of a substantially flat pocket that extends vertically and is open at its top and bottom ends, said gas/air heat exchanger/recuperator being inserted in this compartment;

said gas/air heat exchanger/recuperator includes two series of metal-walled adjacent, alternating vertical tubes, namely a first series allowing the passage of the still-hot gases circulating between the secondary exchanger and the exit sleeve and a second series allowing the passage of the outside air to be heated;

said tubes have a flattened cross section and are adjacent via their faces corresponding to the larger sides of this cross section;

said gas/air heat exchanger/recuperator is produced from a single, concertina-folded sheet of metal;

one of said series of vertical tubes is open at the top and bottom, allowing the top-to-bottom passage of the outside air to be heated, while the other series of vertical tubes opens out inside the jacket via entry and exit openings for the flue gases made in the wall of the compartment, in its base and in its upper part, respectively.

A further aim of the invention, in a preferred embodiment of the unit, is to propose a structure that makes it possible easily to remove the additional gas/air exchanger such that it is possible to periodically wash it in order to remove the impurities it has captured.

To that end, in accordance with a number of additional advantageous but non-limiting features of the invention:

said gas/air heat exchanger/recuperator is removable and may easily be taken out of the compartment, particularly so that it can be washed;

said gas/air heat exchanger/recuperator firstly has the configuration of a substantially parallelepipedal rectangular cassette that can be pushed into the compartment by means of translation from top to bottom, this cassette being provided with a rigid tubular casing of rectangular cross section, open at its lower and upper ends, and secondly includes two series of metal-walled adjacent, alternating vertical tubes, namely a first series allowing the passage of the flue gases and a second series allowing the passage of the outside air to be heated, these tubes being arranged hermetically inside said casing, suitable windows made in a larger face of the casing, in its base and in its top part, allowing, respectively, the entry and the exit of the flue gases in the first series of tubes;

said bottom and top windows are dimensioned and positioned such that one is opposite the entry opening and the other is opposite the exit opening for the flue gases made in the wall of the compartment, when the cassette is fully inserted inside said compartment;

said cassette is equipped in its base with a peripheral seal capable of guaranteeing its leaktightness in the bottom of the compartment;

said casing is provided in its upper part with a peripheral rim (82) capable of ensuring that it bears and/or is fixed against the upper edge of the compartment;

said gas/air heat exchanger/recuperator includes a pair of plates in the form of grilles having solid areas that are fixed by nesting and adhesive bonding to the upper and lower edges of the two series of tubes such that they block off those of the first series receiving the flue gases, these solid areas being separated by slits that form the mouths of the tubes of the second series that allow the passage of the outside air to be heated.

According to another preferred feature of the invention, the bottom of the unit has orifices for recovering and evacuating the condensates generated both by the condensation of the flue gases and by the condensation of the combustion air inside the gas/air heat exchanger/recuperator.

A subject of the invention is also a removable gas/air heat exchanger/recuperator designed for equipping a heat exchanger as described above and suitable for being marketed as an accessory or as a spare part.

BRIEF DESCRIPTION OF THE DRAWINGS

Further features and advantages of the invention will become apparent from the description and from the appended drawings that, simply by way of non-limiting examples, represent possible embodiments thereof.

In these drawings:

FIGS. 3 to 6 are views showing the gas/air exchanger fitted to the unit;

FIGS. 8 to 12 show this gas/air exchanger, which has the configuration of a removable cassette, FIG. 8 being a perspective view, FIG. 9 a likewise perspective, "exploded" view, FIG. 10 a side view, FIG. 11 a front view, and FIG. 12 a top view of this cassette;

FIG. 13 is a view of a detail corresponding to the sectioned part referenced N-N in FIG. 12;

FIG. 14 is a sectional side view of the cassette, seen in the vertical plane referenced C-C in FIG. 12;

FIG. 18 is a detail, on a larger scale, of that part of FIG. 14 that is contained inside a broken-line circle.

DETAILED DESCRIPTION OF THE INVENTION

Figure 1:
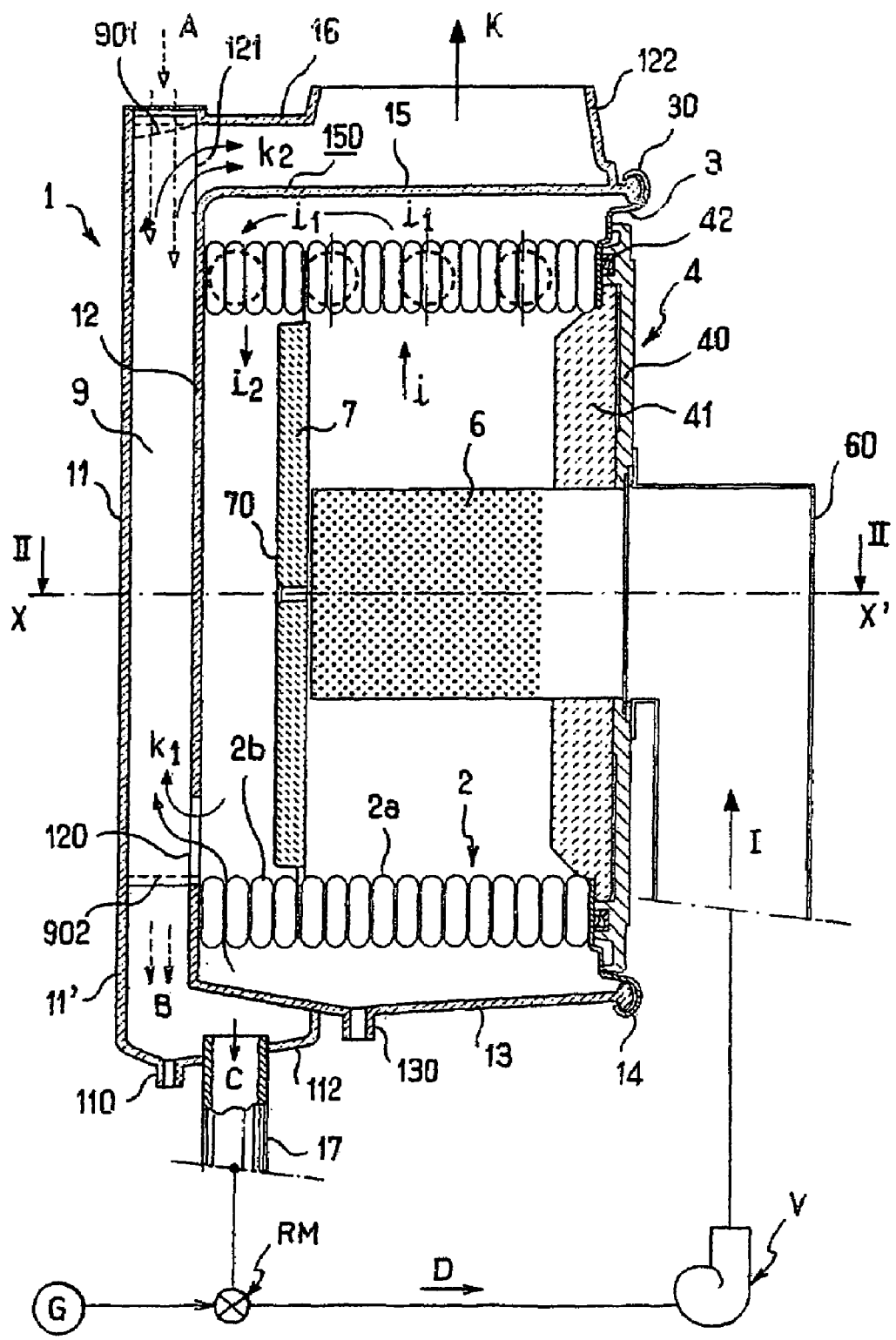
FIG. 1 is a diagrammatic front view of a first embodiment of the exchanger unit that is the subject of the invention, sectioned in a vertical median plane referenced I-I in FIG. 2.
Figure 2:
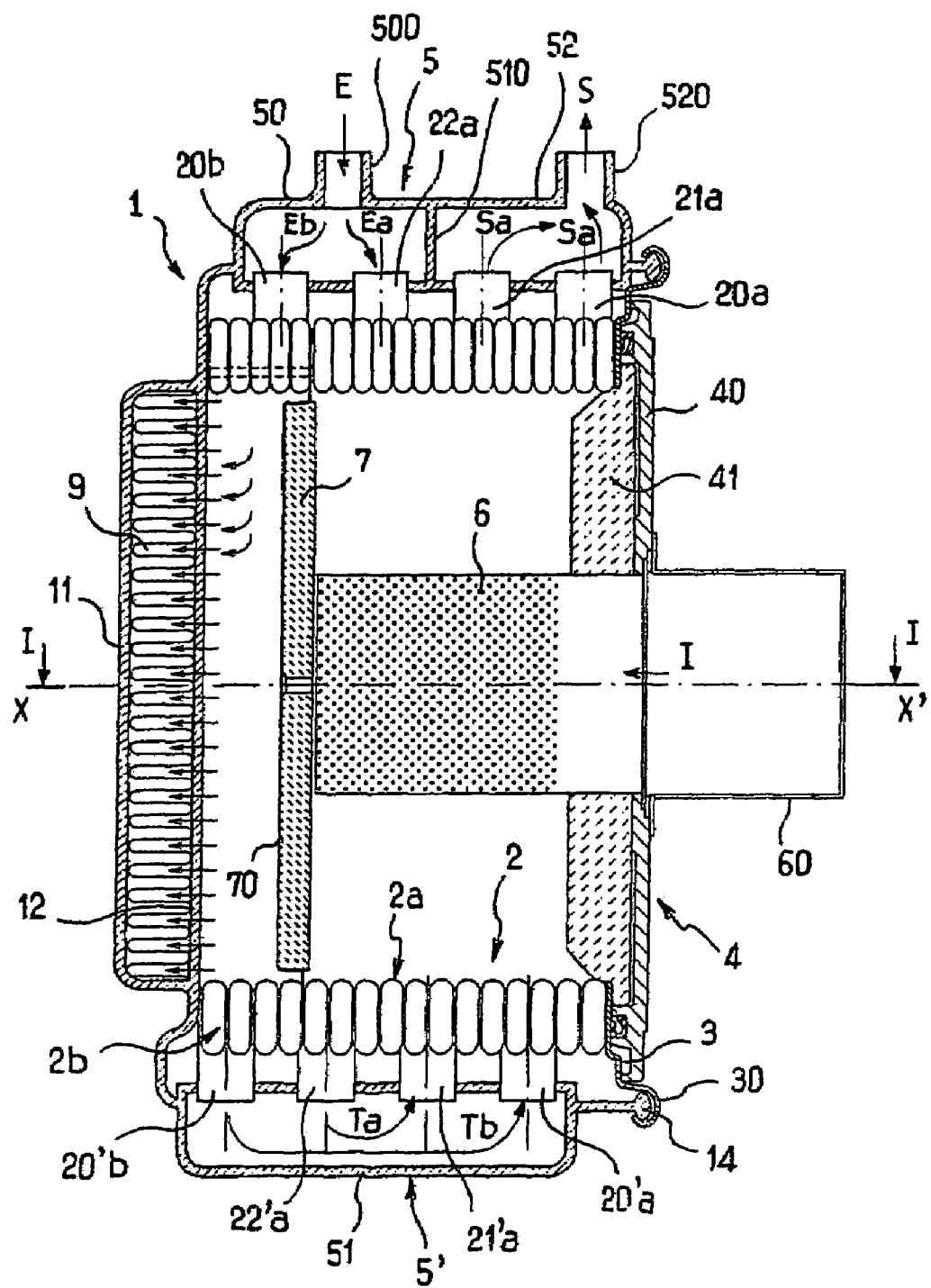
FIG. 2 is a diagrammatic top view sectioned in a horizontal median plane referenced II-II in FIG. 1.

The exchanger shown in FIGS. 1 and 2 includes a casing, or jacket, 1 that delimits a enclosure inside which a double tube bundle 2 is securely mounted, said bundle consisting of two coaxial tube bundles placed end-to-end, one (2a) of which acts as primary exchanger and the other (2b) of which acts as secondary exchanger.

This enclosure has an approximately cylindrical general shape, with a horizontal axis X-X'.

In the embodiment shown, the bundle 2a consists of a group of three adjacent tubes forming a helical coil, with an axis X-X'.

The other bundle 2b consists of a single tube, also wound as a helix and with an axis X-X'.

The three tubes forming the bundle 2a and the tube forming the bundle 2b are identical, of the same length and of the same diameter. The bundle 2a thus has an axial dimension three times as great as that of the bundle 2b.

These are tubes of flattened cross section, in which the large sides are perpendicular to the axis X-X'.

Bosses (not shown) provided on the large faces of the tubes act as spacers, delimiting a gap of substantially constant, set value between each turn.

This coil is designed to be coursed internally by at least one fluid to be heated, for example water.

In the embodiment illustrated, the four helical tubular elements are connected in pairs in parallel, and the two pairs are connected in series, the fluid to be heated being a single fluid that circulates from left to right in FIGS. 1 and 2.

Lateral manifolds 5-5' fixed to the jacket 1 allow the unit to be conventionally connected to a supply line for the cold fluid that is to be heated, this fluid to be transferred from one pair of tubes to the next, and the heated fluid to be evacuated.

Each tubular element has straight end portions, i.e. with a rectilinear axis and with a progressively variable cross section, the opening-out end part of which is circular.

In the example illustrated, the axes of the two end portions of a tubular coil extend in one and the same horizontal plane tangential to the coil, their mouths facing away from one another in an arrangement in accordance with that illustrated in FIG. 24 of European patent 0 678 186 cited above. This arrangement is obviously not obligatory.

The entry and exit mouths of the tubular elements are suitably crimped in a leaktight manner in the openings expressly provided in the jacket 1, and they open out inside the manifolds 5, 5'.

The entry/exit manifold 5 comprises two adjacent chambers separated by an internal partition 510, namely an entry chamber 50 provided with an endpiece 500 and an exit chamber 52 provided with an endpiece 520.

The endpieces 500 and 520 are designed to be connected to a supply pipe for the fluid to be heated and an evacuation pipe for the heated fluid, respectively.

The chamber 50 is connected to the entry end portions 20b, 22a of the two bundle elements 2b, 2a, which the fluid to be heated enters. The chamber 52 is connected to the exit end portions 20a, 21a of the two bundle elements 2a, via which the heated fluid exits.

The opposite manifold 5' has a single transfer chamber 51 connected both to the exit end portions 20'b, 22'a of the two bundle elements 2b, 2a, which the fluid to be heated enters, and to the entry end portions 20'a, 21'a of the two bundle elements 2a via which the heated fluid exits.

In FIG. 2, the arrows symbolize the path of the fluid passing through these coils.

The stream E entering via the endpiece 500 is subdivided into two streams Eb and Ea that each flow through a coil, combine in the chamber 51 and are transferred—arrows Ta, Tb—into the other two coils in order to emerge—arrows Sa, Sb—in the chamber 52 and exit therefrom—arrow S—via the endpiece 520.

Advantageously, the jacket 1 is made from plastic.

It is, for example, produced by rotational molding or by injection molding.

The jacket is made, for example, from two half-shells that are heat-welded together after the tube bundles have been installed inside one of them.

The jacket 1 is open on one of its sides, in this case on the side located on the right in the views in FIGS. 1 and 2.

When the unit is in use, some of the water vapor contained in the burnt gases condenses in contact with the tube walls.

Reference 13 denotes the bottom wall of the enclosure. In a known manner, this bottom slopes, which allows evacuation of the condensates to an exit orifice (drain plug) 130.

The rear wall (on the left-hand side in FIGS. 1 and 2) of the jacket is double. It is formed from a vertical principal wall, bearing reference 12, and an external wall portion 11, parallel to the wall 12, constituting the bottom of a reinforcement, or dish, accommodating a gas/air heat exchanger 9.

The upper wall 15 of the jacket is connected, at the rear, to the principal wall 12.

It is surmounted by a partition 16 connected to the outer wall 11.

The walls 15 and 16 define a channel 150 that connects the double rear wall 11-12 to an evacuation sleeve 122 for the cooled gases (flue gases).

Of course, the orifice 130 is connected to an evacuation line for the condensates, while the sleeve 122 is connected to an evacuation line for the flue gases, for example a chimney duct. These lines are not shown in the figures.

The (open) right side of the jacket is blocked off by a facade element 3 fixed over its entire periphery by a rim 30 crimped in a gastight manner onto a peripheral bead 14 bordering the jacket entrance.

A seal, for example a silicone seal (not shown), may advantageously be provided at this point.

The facade plate 3, which is, for example, made from stainless steel, is normally closed off by a removable door 4.

In the embodiment shown, the door 4 is in two parts. It is composed of an outer plate 40 made from heat-resistant plastic or metal and an inner plate 41, which is thicker, made from refractory, thermally insulating material, for example a material based on ceramics. An annular seal with lips 42 housed in a suitable groove made in the plate 40 enables the plate to be applied in a gastight manner against the outer face of the facade 3.

Each of the plates 40, 41 has, in the central part, a circular opening traversed by a burner 6, for example a gas burner, which is secured to the door 4 by means that are not shown.

Suitable means connected to the burner 6 allow a mixture of a combustible gas, such as propane, and (combustion) air to be supplied to the unit via a line 60.

These means include a fan V capable of blowing in the gas mixture produced beforehand via a mixer tap (valve) RM in the burner 6.

The burner is a cylindrical tube with a closed end, the wall of which is pierced with a multitude of small holes allowing the passage of the combustible mixture, radiating from the inside toward the outside of the tube.

The outer surface of this wall constitutes the combustion surface.

An ignition system of known type (not shown) that includes, for example, a spark-generating electrode, is obviously associated with the burner.

The burner is located coaxially in the center of the coil 2, but does not extend over the entire length of the latter. It is located only inside the bundle 2a.

This device is provided with a deflection plate 7 interposed between the two bundles 2a-2b.

The plate 7 consists of a disk made from heat-refractory, insulating material, for example a material based on ceramics. It is supported by a discoid frame in the form of a thin plate 70 of stainless steel, of larger diameter.

The bundle 2a is held captive axially between the door 4 and the disk 7, the support plate 70 of which is fixed against its last turn (inner side, on the left).

Similarly, the bundle 2b is held captive axially between the rear wall 12 and the disk 7, the support plate 70 of which is fixed against its last turn (on the side facing the inside of the jacket, on the right).

Should the jacket be made from plastic, mechanical containment means for each bundle, of the type described in French patent application No 02/12848 mentioned above, are provided in order to prevent the axial expansion forces being transmitted to the jacket wall.

Furthermore, these bundles are preferably surrounded by a barrel forming a heat shield to prevent the jacket being directly exposed to the hot gases, in an arrangement similar to that described in French patent application No 03/00775, also mentioned above.

Neither the mechanical containment means nor the barrel have been shown here in order not to overburden the drawings and the present description to no avail.

With reference, now, to FIGS. 3 to 6, a description will be given of the structure of the gas/air heat exchanger/recuperator installed in the rear face of the unit.

As already stated, the rear wall 12 of the jacket 1 is vertical and it has a double wall 11-12. This double wall delimits a substantially flat vertical compartment that is open at its top and bottom ends, and the gas/air heat exchanger/recuperator 9 is inserted in this compartment.

This heat exchanger is produced from a flat sheet of "concertina-bellows"-folded stainless steel (cf. FIGS. 3, 4, and 6). This is a very thin sheet having, for example, a thickness of the order of 0.3 mm.

The faces corresponding to the folds of this bellows form parallel, vertical planar bands perpendicular to the walls 11 and 12.

They are pinched and welded in pairs at their top 91 and bottom 92 ends. Each pair of welded bands constitutes a flat tube 90 that is open toward the front (toward the right in FIGS. 4 and 5) and closed at its top and bottom ends.

The space 900 between two pairs of welded bands, however, is open both toward the rear (toward the left in FIGS. 4 and 5) and at its top and bottom ends.

In the example illustrated, the exchanger 9 includes a series of thirteen flat tubes 90 alternating with a series of twelve spaces 900. These spaces have the same width as the tubes 90.

This bellows structure has a configuration in the general form of a flat rectangular box that can be nested from the top downward in the compartment delimited by the two walls 11 and 12, the cross section of which complements that of this box.

This compartment is open at its top and bottom ends.

The inner wall 12 has a pair of bottom 120 and top 121 windows (rectangular openings). The top window is located above the upper wall portion 15 forming the mouth of the gas-evacuation channel 150.

These openings arrive opposite the lower and upper portions of the exchanger 9 structure when the latter is inserted into the rear wall 11-12. They extend over the entire width of this structure.

In this way, each of the tubes 90 is closed at its top and bottom ends by pinched, welded zones 91, 92 to the rear by a bellows fold, and is closed off toward the front over the majority of its height by the wall 12.

However, it opens out in its bottom and top parts, respectively, via the window 120 inside the unit and via the window 121 inside the channel 150 that leads to the sleeve 122.

Each of the spaces 900 located between these tubes is open at its top 901 and bottom 902 ends, closed at the front by a bellows fold, and closed off to the rear by the wall 11. It thus constitutes a kind of chimney that opens out toward the top and bottom only.

Suitable means (not shown) ensure that the exchanger 9 structure is held in its housing, between the two walls 11 and 12, and that the seal is satisfactory.

The upper part of the compartment 11-12 is connected to the atmosphere by means of an air-supply hose (not shown) which, for example, passes through an opening pierced in the wall of the dwelling equipped with this unit.

Cold air captured on the outside can thus, via this hose, reach the upper entry 901 of the chimneys 900.

The partition 11 extends downward, beyond the end of the compartment 11-12, in the form of a portion 11' connected to a sloping bottom element 112 integral with the principal bottom 13.

The bottom 112 slopes, its lowest point having a condensate-recovery orifice similar to the orifice 130 that is also connected to an evacuation line (not shown).

This bottom 112 is also penetrated in a leaktight manner by an air-transfer tube 17. This tube 17 is connected to one of the two entries of the mixer tap, or valve, RM mentioned above, a source of fuel gas, for example propane, being connected to the other entry.

Obviously, this valve is regulated in order to supply the burner 6 with the appropriate proportions of gas and air, via the fan V.

It will be noted that the upper edge of the tube 17 projects above the bottom 112 over a certain height. Moreover, its axis is offset relative to that of the exchanger 9. By virtue of this arrangement, the air leaving the bottom of this exchanger to penetrate the mouth of the tube 17 has to follow a sinuous path, and the likelihood of the condensates conveyed by the air stream penetrating this tube is thus reduced.

The way in which the unit functions will now be explained.

The fluid, for example cold water, to be heated, was placed in circulation. A combustible gas mixture, symbolized by arrow I, is supplied to the burner 6 by blowing from the fan V, via the line 60.

The burner 6 now alight, the hot gases generated by it firstly flow through the first part 2a of the bundle 2 (on the right of the deflection plate 7a), passing between the tube gaps radially, from the inside to the outside (arrows i). They cannot escape axially owing to the presence of the deflection disk 7.

By virtue of the presence of the upper part of the wall of the jacket, they cannot escape immediately via the sleeve 122 either.

They are channeled toward the left (arrow $i_1$) and forced to pass through the rear part 2b of the exchanger, above the plate 7, this time from the outside to the inside (arrow $i_2$), preheating the water circulating in the tube bundle.

Their only means of exit is thus the window 120, through which they flow (arrows $k_1$).

At this stage, their temperature has dropped substantially owing to the heat transfer that has taken place between the hot gases and the fluid flowing through the bundles 2a and 2b.

By virtue of the presence of the gas/air exchanger/recuperator 9, it will nevertheless be possible for this temperature to be reduced further.

The gases traversing the window 120 are flue gases channeled into the tubes 90, which they flow through from bottom to top in order to emerge therefrom via the upper window 121 (arrows $k_2$) and, finally, to be evacuated via the channel 150 and the exit sleeve 122 (arrow K).

The fan V also has the function of drawing in fresh air from the atmosphere in the top part 901 of the exchanger 9 and forcing it to penetrate the tubular spaces 900 (arrows A) and to flow through them from top to bottom. Heat exchange thus takes place with the still-hot gases rising in the adjacent tubes 90.

This heated air emerges at the bottom end 902 of the tubular spaces 900 (arrows B). It penetrates the tube 17 (arrow C), is mixed with the fuel gas G, and the mixture is transferred to the burner (arrows D and I). The overall performance of the unit is thus substantially improved and combustion is better.

In fact, while passing through the exchanger 9, the flue gases sweep over the relatively cold walls, the temperature of which is necessarily lower than the dew point, this giving rise to complete or almost complete condensation of the residual water vapor located there. They thus transfer a significant amount of their latent heat to the combustion air that is also flowing, countercurrently, through the exchanger.

The impurities present in the flue gases are largely trapped by the condensate.

The condensate flows to the base of the chimneys 90 via the window 120, flows through the gaps in the bottom zone of the coil 2b and mix together with the condensates formed inside the jacket, on the bottom 13, in the region of the evacuation orifice 130.

The air captured on the outside is cold and, in general, moist.

The water vapor it conveys also tends to condense on the hot walls of the exchanger 9.

The droplets formed there trap the impurities.

The impurity-laden condensate trickles into the tubular spaces 900 and flows under gravity over the bottom 112, toward the evacuation orifice 110. It is thus not only heated, but also clean, dry air that is used as combustion air, thus generating optimum combustion and reducing the risks of fouling.

The complementary cooling performed by the gas/air exchanger also makes it possible to reduce visible pollution resulting from the escape of the burnt gases out of the sleeve, on the outside of the building. The white plumes that are the result of too great a difference in temperature between these gases and the outside air are notably reduced or even eliminated.

In the embodiment illustrated in FIGS. 7 to 18, the additional gas/air exchanger 9 has the configuration of a removable cassette (or box).

Figure 7:
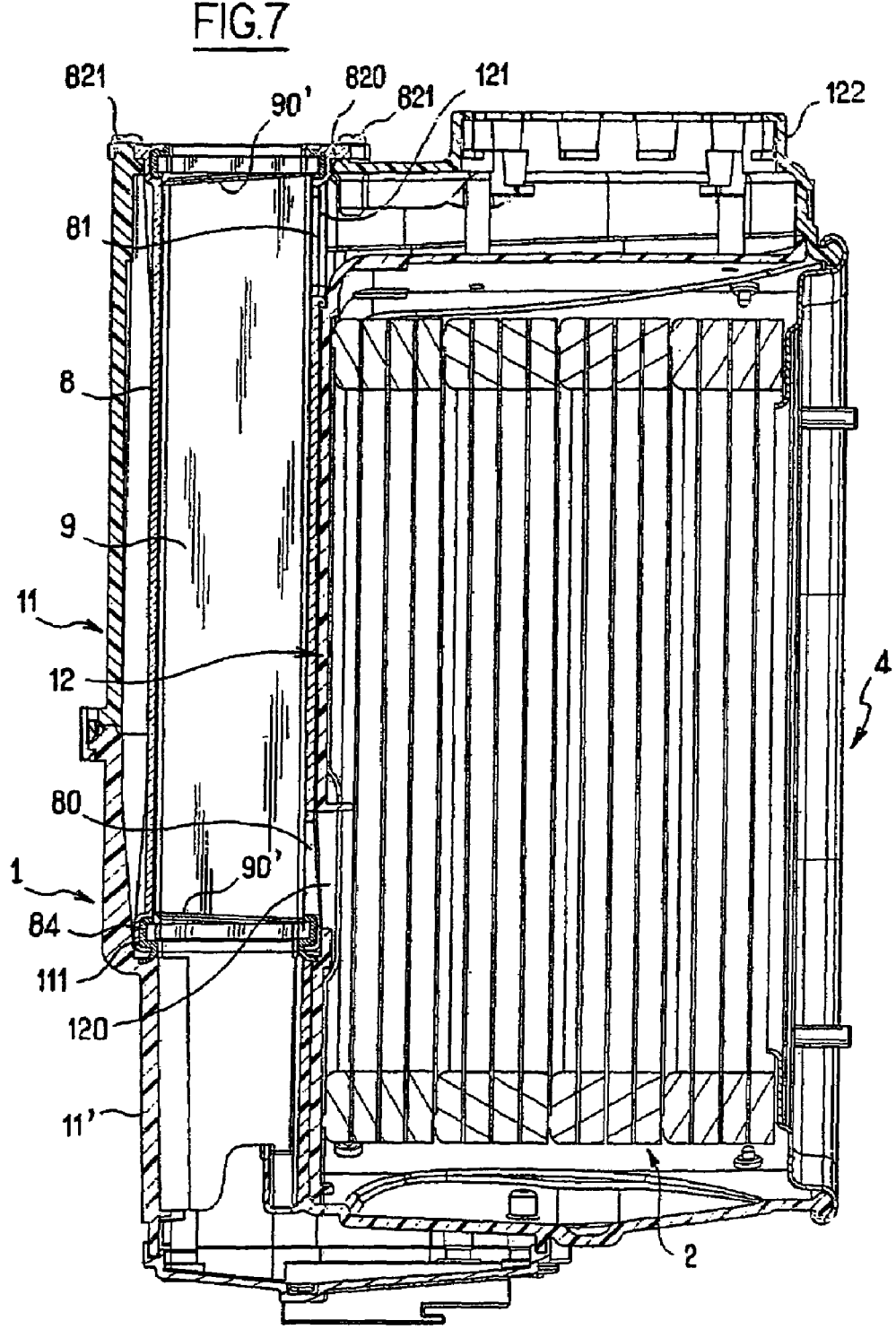
FIG. 7 is a diagrammatic, simplified front view of a second embodiment of the unit, in which the gas/air exchanger is removably mounted.
Figure 8:
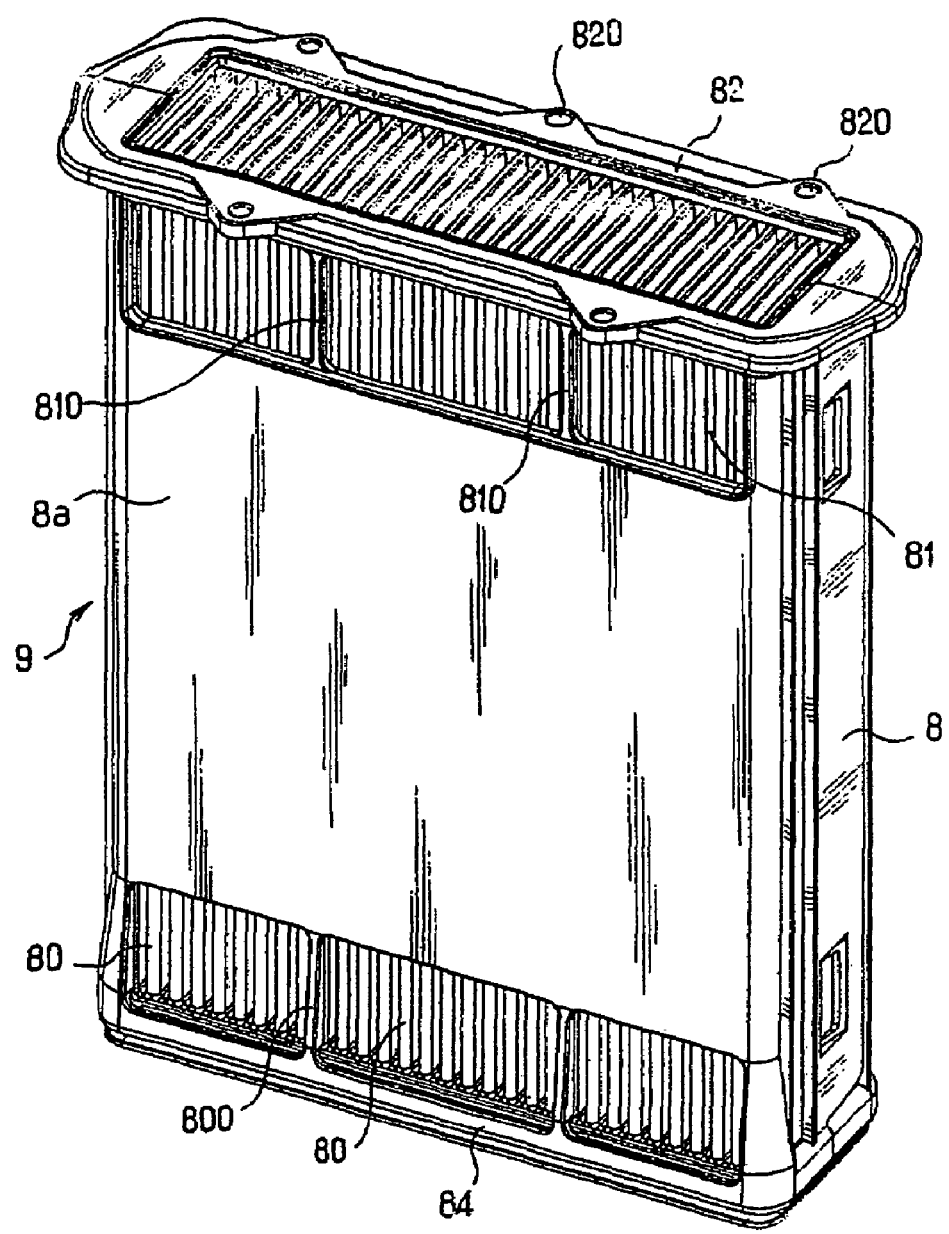

This unit, illustrated in FIG. 7, has the same general design as that of FIGS. 1 and 2. It has a jacket 1 made from injection-molded plastic. The cassette forming the additional gas/air exchanger 9 is inserted by means of vertical translation, from top to bottom, in the compartment delimited by the wall portions 11-12 of this jacket, the form of which complements that of the cassette.

It can also be removed therefrom easily by being pulled upward.

As may be seen more particularly in FIGS. 8 to 11, this cassette substantially has the form of a relatively flat, rectangular parallelepiped, the width and height of which are significantly greater than the thickness.

It includes a tubular casing 8 made from thermally and mechanically resistant plastic. It is open at its top and bottom ends. It has a rectangular cross section, with rounded corners (cf. FIG. 15), and is composed of two half-casings 8a, 8b of "U"-shaped cross section clipped together by means of lateral snap-fit tabs 83.

This casing holds the body of the exchanger 9 captive, the structure of which, with vertical tubes 90-900, is similar to that of the preceding embodiment.

The upper part of the casing 8 has a rim 82 that enables it to bear and to be fixed, using screws traversing holes 820 pierced in this rim, against the upper edge of the receiving compartment. In FIG. 7, the head of these screws is referenced 821.

The upper 84 (located under the rim 83) and lowe 85 portions of the casing are extra thick, forming swellings that face outward, the contour of which is thus dimensioned such that it fits with minimal clearance—even slightly forcibly—inside the receiving compartment 11-12.

One (8a) of the two half-casings has a large face penetrated by top 81 and bottom 80 horizontal rectangular openings (windows) running over its entire width. In fact, each of these openings is subdivided into three smaller, adjacent openings separated by vertical stiffening bars 800, 810, respectively. The function of these bars is to prevent deformations of the wall of the casing in this region.

These windows 80, 81 are designed to face the windows 120 and 121, respectively, when the cassette is correctly positioned in its receiving compartment (cf. FIG. 7), allowing passage of the flue gases.

It will be noted that the upper rim 82 includes five tabs receiving the holes 820 for the passage of the fixing screws. Three tabs are located on one side of the cassette and two on the other side (on the windows 80 and 81 side).

Five tapped holes in the same arrangement are provided in the walls of the compartment, three holes being pierced in the wall 11 and two holes in the wall 12. This arrangement aids location at the time of mounting, avoiding the cassette being poorly positioned, with the solid face of the half-casing 8a opposite the windows 120 and 121.

Unlike the preceding embodiment, the various concertina folds forming the vertical tubes 90 and 900 are not welded in the upper and lower parts. The upper and lower areas are deformed and pinched in pairs, and the pinched portions are fixed together using upper 93 and lower 93' plastic grilles that are nested and adhesively bonded to said portions.

Figure 9:
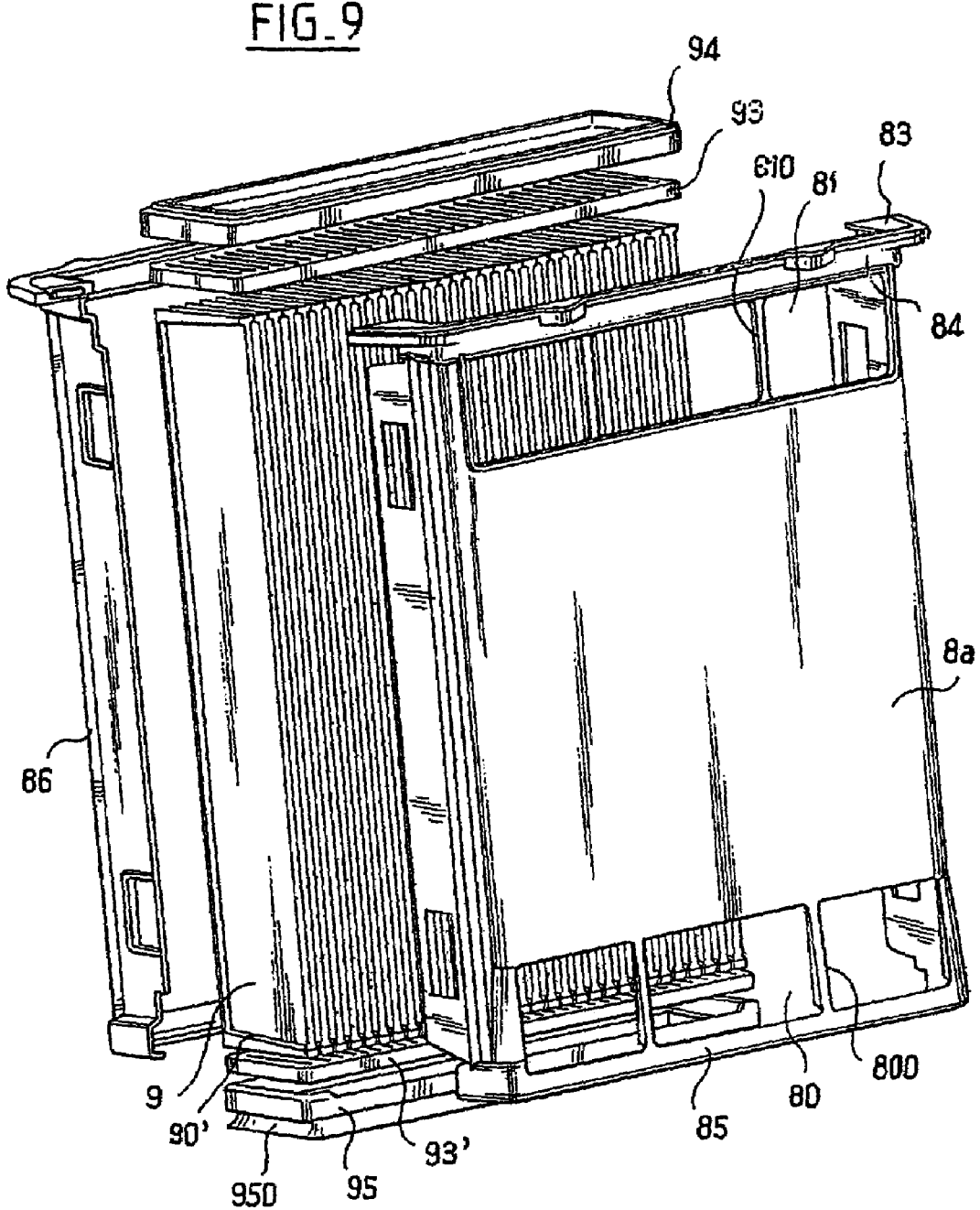
Figure 10:
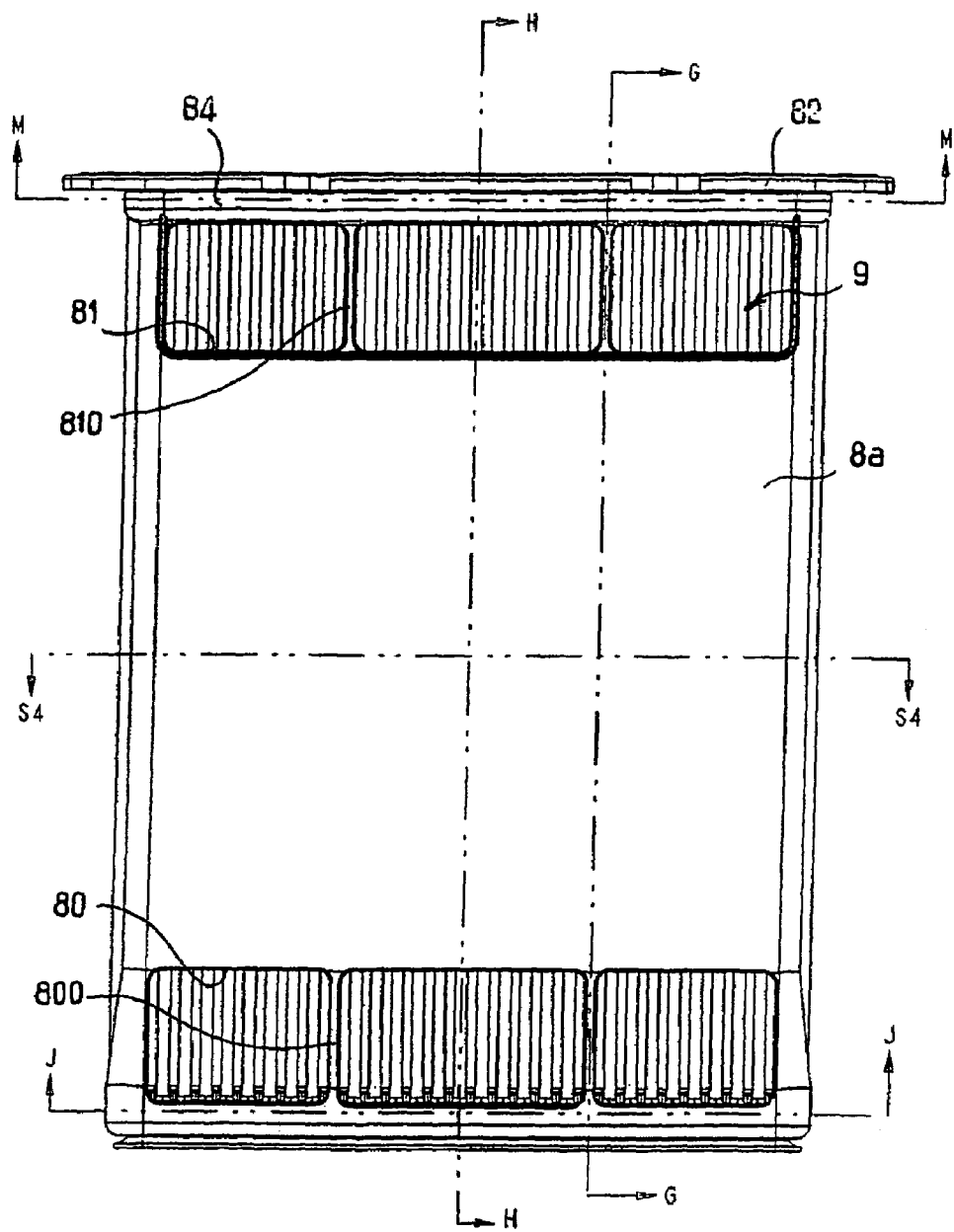
Figure 15:
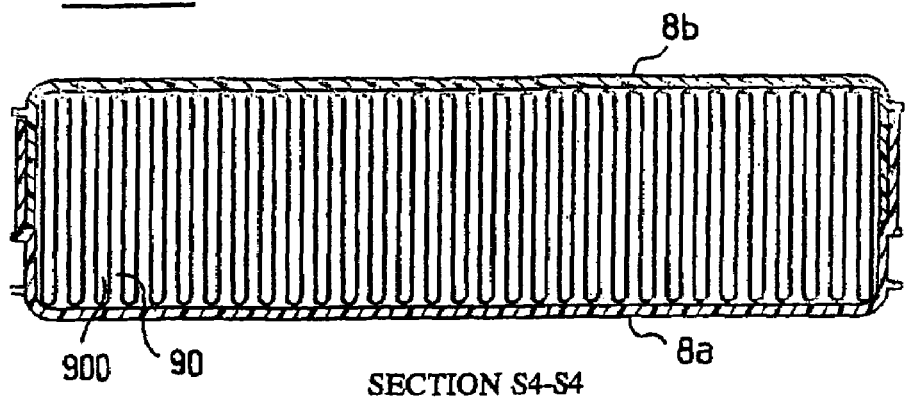
FIGS. 15, 16, and 17 are transverse sectional views in horizontal planes referenced, respectively, S4-S4, S5-S5 and F-F in FIGS. 10 and 11.
Figure 16:
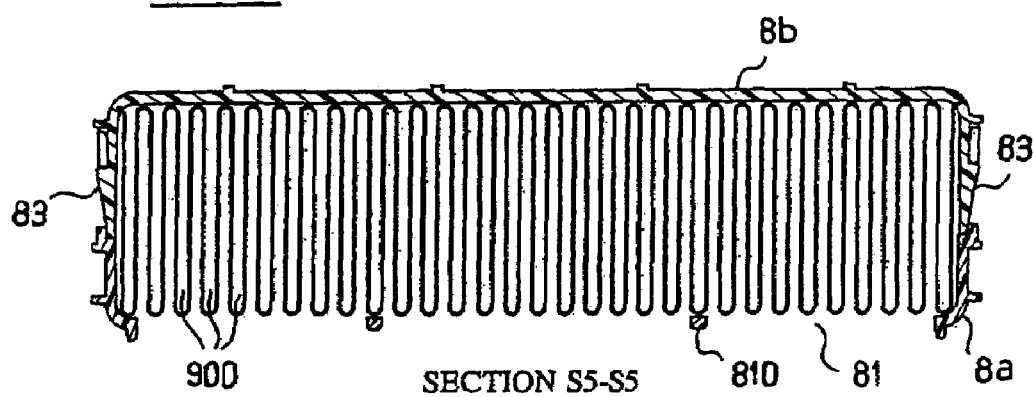
Figure 17:
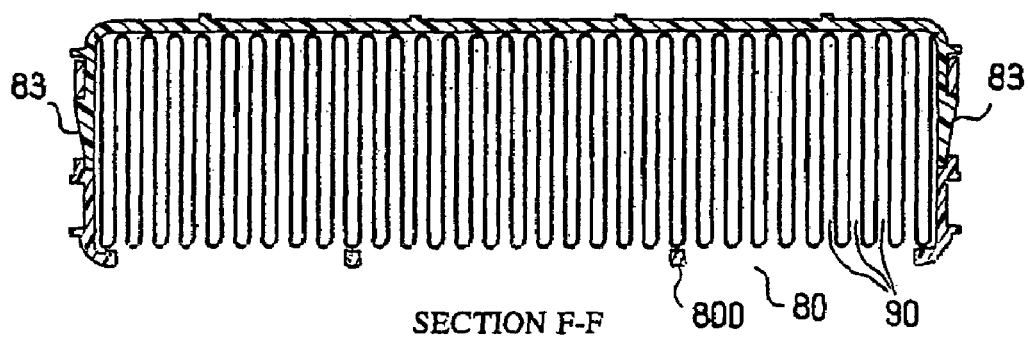

More precisely, these grilles are horizontal rectangular plates capping the lower and upper faces of the metallic body of the exchanger (cf. FIG. 9).

Their solid areas are bars whose inner face (facing the metallic body) has a slit shaped in order to nest over a pinched portion, after an appropriate adhesive has been placed in between. These solid areas are separated by slits forming the top and bottom mouths 901, 902 of the chimneys 900 through which the combustion air flows.

The chimneys 900 are closed on the rear side by the wall of the half-casing 8b (cf. FIGS. 15 to 17) and on the front side by the folds of the metal sheet.

The chimneys 90 through which the flue gases pass are blocked off at the top and bottom ends by said solid areas of the grilles 93, 93'. They are closed on the front side, except at the level of the openings 80 and 81, by the wall of the half-casing 8a (cf. FIGS. 15 to 17), and on the rear side by the folds of the metal sheet.

The ends of the tubes forming the chimneys 90 are pinched in a slightly oblique line 90' (cf. FIGS. 7 and 9) so that their bottom ends descend toward the base of the window 80, thereby facilitating the outflow and evacuation of the condensate resulting from the flue gases.

Insofar as the metallic body of the exchanger 9 has a symmetrical shape, allowing it to be mounted without distinction in two 180°—offset positions (bottom instead of top) in the casing 8 in order to avoid wrong-side fitting when mounting, there is also the sloping line 90' at the top end, although at this location this configuration affords no real advantage.

A peripheral seal 94 designed to prevent fume leaks is interposed between the upper swollen portion 84 of the casing and the grille 93.

Similarly, a peripheral seal 95 is interposed between the lower swollen portion 85 of the casing and the grille 93'. The seal 95 has a flexible lip 950 facing downward, capable of being applied against the peripheral shoulder 111 bordering the bottom of the compartment 11-12, forming a recess with the extension of the wall 11'.

The cassette may be removed easily from the unit after removal of the screws holding it in the jacket compartment, by being pulled upward. It may then be washed, by rinsing in a stream of water, for example by being placed under a tap and oriented in such a way that the water passes through all the tubes.

This washing can be carried out periodically, for example annually, when the boiler is serviced.

It allows the tubes 900, 90 through which the air and the flue gases pass to be stripped of polluting particles that are deposited on their walls over time.

Having been carefully washed, the cassette may be re-inserted into its housing, by means of insertion from top to bottom, and fixed to the jacket 1 using the screws.

It goes without saying that it is possible, without departing from the scope of the invention, to provide bundles designed and connected in such a way that they allow more than one liquid to be heated.

The invention also applies to condensation exchangers in which it is possible to heat one (or more) liquid(s), not only using the combustion gases generated by the burner but also using an additional hot gas, as mentioned, for example, in French patent application No 03/05105, which serves as the basis for the priority-date claim of the present patent application.

The dimensions of the unit, which are governed particularly by the cross section, the diameter and the length of the tube bundles, and also by the type of burner used, are obviously adapted to the desired power output and to the conditions of use.

The unit is advantageously equipped with a temperature probe fitted in order to cut off the supply to the burner when the probe detects a pre-set excessive temperature.

The invention claimed is:

1. A condensation heat exchanger adapted to interface with a gas or fuel-oil burner, the condensation heat exchanger comprising two coaxial tube bundles placed end-to-end, one of which acts as primary exchanger and the other of which acts as secondary exchanger, each of these bundles comprising at least one of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix, wherein the width of the gap separating two adjacent turns is constant and smaller than the thickness of said cross section, said bundles being mounted securely inside a gas-impermeable jacket, the condensation heat exchanger further comprising a device adapted to circulate at least one fluid to be heated inside the tube(s) forming said bundles, said jacket having a burnt-gas-evacuation sleeve, the exchanger being arranged such that hot gases generated by the burner flow radially, or approximately radially, through said bundles, passing through gaps separating turns of the bundles, a deflection plate being interposed between these two bundles and arranged in such a manner that hot gases generated by the burner first flow through the primary exchanger, flowing through the gaps separating its turns from the inside to the outside, then through the secondary exchanger, flowing through gaps separating its turns from the outside to the inside, after which the hot gasses are evacuated to the outside via said sleeve, wherein said jacket has a wall portion having the configuration of a compartment and the condensation heat exchanger is provided with an additional gas/air heat exchanger/recuperator that is inserted inside said compartment and is adapted for recovering some heat conveyed by the hot gases circulating between the secondary exchanger and the exit sleeve and transferring heat to air captured outside the exchanger, the condensation exchanger further including a device adapted to transfer the air heated by the additional gas/air heat exchanger/recuperator to the entrance of said burner.

2. The heat exchanger as claimed in claim 1, wherein said compartment comprises a substantially flat pocket that extends vertically and is open at its top and bottom ends, said gas/air heat exchanger/re cuperator being inserted in the compartment.

3. The heat exchanger as claimed in claim 2, wherein said gas/air heat exchanger/recuperator includes two series of metal-walled adjacent, alternating vertical tubes, wherein a first series allows the passage of the hot gases circulating between the secondary exchanger and the exit sleeve and a second series allows the passage of outside air to be heated.

4. The heat exchanger as claimed in claim 3, wherein said tubes have a flattened cross section and are adjacent via their faces corresponding to the larger sides of the cross section.

5. The heat exchanger as claimed in claim 4, wherein said gas/air heat exchanger/recuperator is produced from a single, concertina-folded sheet of metal.

6. The heat exchanger as claimed in claim 3, wherein one of said series of vertical tubes is open at the top and bottom, allowing top-to-bottom passage of the outside air to be heated, while the other series of vertical tubes opens out inside the jacket via entry and exit openings for the flue gases made in the wall of the compartment, in its base and in its upper part, respectively.

7. The heat exchanger as claimed in 6, wherein said gas/air heat exchanger/recuperator is removable and may easily be taken out of the compartment, wherein said gas/air heat exchanger/recuperator has the configuration of a substantially parallelepipedal rectangular cassette adapted to be pushed into the compartment through translation from top to bottom, the cassette being provided with a rigid tubular casing of rectangular cross section, open at its lower and upper ends, and includes two series of metal-walled adjacent, alternating vertical tubes, a first series of the two allowing for the passage of the flue gases and a second series of the two allowing for the passage of the outside air to be heated, these tubes being arranged hermetically inside said casing, wherein suitable windows made in a larger face of the casing, in its base and in its top part, allow for, respectively, the entry and the exit of the flue gases in the first series of tubes, and wherein bottom and top windows are dimensioned and positioned such that one is opposite the entry opening and the other is opposite the exit opening for the flue gases are present in the wall of the compartment when the cassette is fully inserted inside said compartment.

8. The heat exchanger as claimed in claim 7, wherein said cassette is equipped in its base with a peripheral seal capable of guaranteeing its leak tightness in the bottom of the compartment.

9. The heat exchanger as claimed in claim 1, wherein said gas/air heat exchanger/recuperator is removable and may easily be taken out of the compartment.

10. The heat exchanger as claimed in claim 9, wherein said gas/air heat exchanger/recuperator has the configuration of a substantially parallelepipedal rectangular cassette adapted to be pushed into the compartment through translation from top to bottom, the cassette being provided with a rigid tubular casing of rectangular cross section, open at its lower and upper ends, and wherein said gas/air heat exchanger/recuperator includes two series of metal-walled adjacent, alternating vertical tubes, a first series of the two allowing for the passage of the flue gases and a second series of the two allowing for the passage of the outside air to be heated, these tubes being arranged hermetically inside said casing, wherein suitable windows made in a larger face of the casing, in its base and in its top part, allow for, respectively, the entry and the exit of the flue gases in the first series of tubes.

11. The heat exchanger as claimed in claim 10, wherein said casing is provided in its upper part with a peripheral rim capable of ensuring that it at least one of bears and is fixed against an upper edge of the compartment.

12. The heat exchanger as claimed in claim 10, wherein said gas/air heat exchanger/recuperator includes a pair of plates in the form of grilles having solid areas that are fixed by nesting and adhesive bonding to upper and lower edges of the two series of tubes such that they block off those of the first series receiving the flue gases, these solid areas being separated by slits that form mouths of the tubes of the second series that allow the passage of the outside air to be heated.

13. A removable gas/air heat exchanger/recuperator designed for equipping a heat exchanger as claimed in claim 10.

14. The heat exchanger as claimed in claim 1, wherein the bottom of the heat exchanger has orifices for recovering and evacuating condensates generated both by condensation of the flue gases and by condensation of combustion air inside the gas/air heat exchanger/recuperator.

15. The heat exchanger as claimed in claim 2, wherein the fluid to be heated is cold water.

16. The heat exchanger as claimed in claim 1, wherein the device adapted to transfer the air heated by said gas/air recuperator is a fan.

* * * * *